Patented June 9, 1936

2,043,766

UNITED STATES PATENT OFFICE 2,043,766

METHOD OF MANUFACTURING RUBBER BONDED ABRASIVE ARTICLES

Charles S. Nelson, Niagara Falls, N. Y., assignor to The Carborundum Company, Niagara Falls, N. Y., a corporation of Pennsylvania No Drawing. Application October 5, 1934, Serial No. 746,977

6 Claims. (Cl. 51—278)

This invention relates to an improved method of manufacturing rubber bonded abrasive articles. More specifically the invention is concerned with a method of manufacturing a material for use in the manufacture of abrasive articles which comprises abrasive grains to which are attached particles of vulcanizable rubber compound.

This rubber coated grain and a method of manufacturing it are disclosed and claimed in United States Patent No. 1,976,798. The present invention is concerned with an improvement in the method of making this material.

According to the invention of United States Patent No. 1,976,798 there is provided an intermediate product for use in the manufacture of abrasive articles which consists of individual abrasive grains and clusters of a few grains to which are attached particles of vulcanizable rubber compound. The product is readily distributable in a mold, can be kept in storage indefinitely, and provides articles having unusual grinding properties not attainable by methods formerly used in the manufacture of rubber bonded abrasives. For purposes of brevity, this intermediate product will herein be referred to as a "distributable rubber mix" by which is meant the individual abrasive granules and clusters of a few granules to which are attached a vulcanizable rubber compound.

The method for making a distributable rubber mix that is disclosed and claimed in United States Patent No. 1,976,798 is briefly as follows:

Abrasive grains are mixed with an artificial rubber dispersion prepared by dispersing coagulated rubber in water by known methods as for example by kneading the rubber in the presence of water and a dispersing agent such as bentonite clay until the rubber becomes dispersed in water.

A vulcanizing agent such as sulphur and a coagulant such as an aqueous solution of lead acetate are incorporated in the mixture, as well as inert fillers such as lamp black or a mild alkali such as magnesium oxide if desired.

The mixture is then dried to what Nelson and Porter refer to as the "critical moisture content", which usually amounts to about 7% of the total mix whereupon it is disintegrated or broken up into an intermediate distributable mix. This mix is then further dried to equilibrium with the surrounding atmosphere and again disintegrated to form the distributable rubber mix which is the intermediate product used in the manufacture of rubber bonded abrasive articles.

Disintegration at either or both of the two stages is performed by passing the material through a sort of mechanical flail or by forcing it through a screen having a mesh somewhat larger than that of the abrasive granules.

I have found that a distributable rubber mix can be prepared by a process which is somewhat simpler than the one originally devised and described in United States Patent No. 1,976,798, and which eliminates the step of disintegrating which is performed at the critical moisture content.

Briefly I have discovered that if a mixture comprising abrasive grains and an artificial rubber dispersion is dried to completion and then heated to what I call a "critical temperature" the compact and continuous mass of abrasive grains and rubber can be disintegrated to form a distributable rubber mix as hereinbefore defined. This critical temperature I have found to be at about 225–250° F., some variation being possible depending on the composition of the rubber compound.

I call this a "critical temperature" because if the disintegration is attempted at a temperature below the critical temperature the rubber is so tough that it cannot be disrupted and the mix will disintegrate into a mass of uncoated abrasive grains and pieces of rubber while if the mixture is heated above the critical temperature range the rubber compound becomes vulcanized sufficiently to preclude proper knitting of the particles of rubber compound and the finished abrasive article is deficient in strength.

I will now illustrate my invention by a number of specific examples which are intended to be illustrative only and not limitative.

Example I 920 grams of No. 16 grit abrasive grain are moistened with 8 cubic centimeters of a 10% solution of lead acetate in water and mixed with a previously prepared mixture containing 10 grams of magnesium oxide, 40 grams of sulphur and 200 parts of artificial rubber dispersion containing 40% rubber, about 5% bentonite clay and the remainder water. The mixture is of such proportions and sufficiently viscous so that the bond does not separate from the grain, which is of sufficient bulk to be self supporting.

After thoroughly mixing these ingredients, the mixture is spread out into a pan in a layer about two inches deep and dried at about 150° F. until the moisture is reduced to a condition of equilibrium with the surrounding atmosphere, or, in other words, to substantial dryness.

The mass is then heated, preferably as rapidly as possible, to a temperature of approximately 240° F. and immediately disintegrated by passing through a machine containing a number of steel rods placed radially about a rotating hub and a set of rods attached to the walls of the chamber enclosing the flails whereby the mass is beaten up into a distributable rubber mix as hereinbefore defined. Alternatively disintegration into a distributable mix can be performed by forcing the mixture heated to the critical temperature through a six mesh screen, the screen also being preferably heated to prevent chilling of the abrasive mixture.

*Example II*

A mixture is prepared of the following ingredients:

80 parts of abrasive grain, No. 120 grit;
10 parts of rubber in the form of an artificial dispersion;
5 parts of sulphur;
2 parts of carbon black;
2 parts of rouge;
1 part of magnesia made into a paste with 1 part of water;
0.1 part of lead acetate added in the form of a 10% solution in water.

The mixture is dried to completion, heated to about 230° F. and disintegrated as in Example I.

As previously stated and as illustrated by the examples, the critical temperature will be found to depend upon the composition of the rubber compound, particularly as to the lower limit. The upper limit is ordinarily determined by the tendency for incipient vulcanization of the rubber compound. In general the critical temperature has been found to lie within the range 225–250° F. and usually the disintegration is more readily accomplished at the higher temperatures. The inclusion of vulcanization accelerators tends to lower the upper limit of the critical temperature since, as stated, the upper limit is determined by the setting in of incipient vulcanization.

My process has a number of advantages over the process of the Nelson and Porter patent. According to the Nelson and Porter process it is necessary that a skilled workman watch the drying closely to determine when the mixture has reached the critical moisture content and if the drying is carried beyond that point the mixture has to be discarded. No such caution is necessary and there is no possibility of wastage in my process since the mixture is dried to completion before it is disintegrated. Furthermore, the older process requires two disintegrations in order to make a distributable mix, one at the critical moisture content and another after the originally disintegrated mixture has been dried to completion. My process requires that the mixture be disintegrated once only, thereby reducing the labor and attendant disintegrating costs by one half.

My process is adapted to a number of variations such as the sequences of the steps in which the ingredients are added in making the mixture, the composition of the mixture, the kind and proportion of fillers or of abrasive grain employed and the temperature of drying.

While I have illustrated my invention by specific examples I do not limit myself to any particular composition of mixture, sequence of steps or the like except as provided by the appended claims.

I claim:

1. The method of making a distributable rubber mix for use in the manufacture of rubber bonded abrasive articles which comprises preparing a mixture comprising abrasive grains, an artificial dispersion of previously coagulated rubber and a vulcanizing agent, drying the mixture until its moisture is substantially all removed, heating the mixture to between about 225° F. and 250° F., and disintegrating the mixture to form a mass of individual abrasive granules and clusters of a few granules to which are attached a dry and vulcanizable rubber compound.

2. The method of making a distributable rubber mix for use in the manufacture of rubber bonded abrasive articles which comprises preparing a mixture comprising abrasive grains, an artificial dispersion of previously coagulated rubber and a vulcanizing agent, drying the mixture until its moisture is substantially all removed, heating the mixture to approximately 240° F. and disintegrating the mixture to form a mass of individual abrasive granules and clusters of a few granules to which are attached a dry and vulcanizable rubber compound.

3. The method of making a distributable rubber mix for use in the manufacture of rubber bonded abrasive articles which comprises preparing a mixture comprising abrasive grains, an artificial dispersion of previously coagulated rubber and a vulcanizing agent, drying the mixture until its moisture is substantially all removed, and then heating the mixture to its critical temperature whereby low cohesion between the bond coated grains without material vulcanization of the rubber is effected, and disintegrating the heated mixture to form a mass of individual abrasive granules and clusters of a few granules to which are attached a dry and vulcanizable rubber compound.

4. The method of making a distributable rubber mix for use in the manufacture of rubber bonded abrasive articles which comprises mixing abrasive grains with sulphur and an artificial rubber dispersion comprising previously coagulated rubber, bentonite clay and water, drying the mixture substantially to completion, and then heating the dried mixture to its critical temperature whereby low cohesion between the bond coated grains without material vulcanization of the rubber is effected, and disintegrating the heated mixture to form a distributable mass of individual abrasive granules and clusters of a few granules to which are attached a vulcanizable rubber compound.

5. The method of making a distributable rubber mix for use in the manufacture of rubber bonded abrasive articles which comprises preparing a mixture comprising abrasive grains, an artificial rubber dispersion and a vulcanizing agent, drying the mixture substantially to completion, and then heating the mixture to a temperature at which it is disintegratable, and disintegrating the heated mixture into a loose distributable mass of readily separable rubber coated grains or small clusters of grain.

6. The method of making a distributable rubber mix for use in the manufacture of rubber bonded abrasive articles which comprises preparing a mixture comprising abrasive grains, an artificial rubber dispersion and a vulcanizing agent, drying the mixture substantially to completion, and then heating the mixture to a temperature at which it is disintegratable but below the temperature at which the rubber compound will vulcanize appreciably in the time required to disintegrate the mixture, and disintegrating the heated mixture into a distributable mass of individual abrasive grains and clusters of a few grains to which are attached a vulcanizable rubber compound.

CHARLES S. NELSON.